(12) United States Patent
Bailly et al.

(10) Patent No.: US 7,809,527 B2
(45) Date of Patent: Oct. 5, 2010

(54) SYSTEM FOR CENTRALIZED MAINTENANCE OF ONBOARD ELECTRONIC EQUIPMENT

(75) Inventors: Carine Bailly, Tournefeuille (FR); Christian Albouy, Villemur-sur-Tarn (FR); François Fournier, Roques sur Garonne (FR)

(73) Assignee: Thales (FR)

( * ) Notice: Subject to any disclaimer, the term of this patent is extended or adjusted under 35 U.S.C. 154(b) by 201 days.

(21) Appl. No.: 11/952,554

(22) Filed: Dec. 7, 2007

(65) Prior Publication Data

US 2008/0147740 A1 Jun. 19, 2008

(30) Foreign Application Priority Data

Dec. 8, 2006 (FR) .................................. 06 10730

(51) Int. Cl.
*G06F 11/30* (2006.01)
*G06F 17/40* (2006.01)

(52) U.S. Cl. ................ 702/184; 702/185; 702/186; 702/187

(58) Field of Classification Search ......... 702/184–190, 702/144–149; 700/100
See application file for complete search history.

(56) References Cited

U.S. PATENT DOCUMENTS 5,847,815 A  12/1998  Albiuy et al.

2002/0143421 A1* 10/2002 Wetzer .................. 700/100
2002/0143443 A1  10/2002 Betters et al.
2006/0097854 A1   5/2006 Basu et al.
2006/0155425 A1   7/2006 Howlett et al.
2008/0129459 A1   6/2008 Bailly et al.

FOREIGN PATENT DOCUMENTS

EP    1445721 A2    8/2004
WO    0115001 A2    3/2001

OTHER PUBLICATIONS

U.S. Appl. No. 11/523,706, filed Sep. 20, 2006, Carine Bailly et al.
U.S. Appl. No. 08/954,227, filed Oct. 20, 1997.
U.S. Appl. No. 10/089,089, filed Aug. 7, 2001.
U.S. Appl. No. 11/523,706, filed Sep. 20, 2006.
U.S. Appl. No. 11/938,099, filed Nov. 9, 2007.

* cited by examiner

*Primary Examiner*—Hal D Wachsman
*Assistant Examiner*—Phuong Huynh
(74) *Attorney, Agent, or Firm*—Lowe Hauptman Ham & Berner, LLP

(57) ABSTRACT

A centralized maintenance system for aircraft which includes line replacement units (LRUs). The system includes at least one digital database whose data are information relating to the LRUs; and a device for updating the data of the database. The lifetime information for the LRUs is known and contained in the digital database. The database includes a mean time between failure (MTBF) data of each LRU. The MTBF data is able to be modified and updated, according to at least one event modifying the failure probabilities for at least one LRU.

4 Claims, 2 Drawing Sheets

SYSTEM FOR CENTRALIZED MAINTENANCE OF ONBOARD ELECTRONIC EQUIPMENT

RELATED APPLICATIONS

The present application is based on, and claims priority from, French Application Number 06 10730, filed Dec. 8, 2006, the disclosure of which is hereby incorporated by reference herein in its entirety.

FIELD OF THE INVENTION

The present invention relates to the maintenance of a set of equipment, such as the set of avionics equipment of an aircraft which fulfil the various functions necessary for accomplishing a flight.

The system relates to improving the diagnosis of an aircraft's maintenance reports and, more particularly, improving the estimation of the possible faults and the quality of the of "lifetime" prognosis for an item of equipment, a module or a card of an item of equipment.

This system makes it possible, notably, to decrease the false fault rate during maintenance operations.

BACKGROUND OF THE INVENTION

An aircraft comprises a large amount of equipment, of diverse nature, mechanical, hydraulic, electrical or electronic, whose proper operation is essential in the course of a flight.

To improve the degree of confidence accorded to this equipment, monitoring of its proper operation is undertaken, as often as possible, for each item. Monitoring generally comprises checking the fundamental parameters and automatic or semi-automatic tests of proper operation. Generally, a fault diagnosis is carried out and may lead to the emitting of fault messages.

A monitoring and alarm function makes it possible to detect a malfunction having an impact on the safety of the aircraft. A function of this type, also called "Flight Warning" in the art, is present on certain Airbus aircraft. Another function, generally, named "Flight Desk Effect" in the art, makes it possible to present these alarms to the crew.

Additionally, a maintenance function is associated with the monitoring function in order to diagnose faults and store them.

It is known by the name of BITE function, derived from the abbreviation of the expression "Built In Test Equipment".

The BITE function of an item of equipment is taken on by electronics which may be specific or shared with other functions of the item of equipment considered. This electronics performs the software processing required by the BITE function.

It comprises a more or less significant hardware part secured to the item of equipment, with, at the minimum, in this hardware part, a nonvolatile memory. Certain data are stored in the volatile memory, including the breaching of standards by the monitored parameters, the results of the tests, the fault diagnostic when it exists as well as the fault messages emitted. The fault messages of the BITE functions of the monitored equipment of an aircraft are addressed, by an airplane data transmission link, to a centralizer item of equipment placed aboard the aircraft so as to bundle together the various fault messages emitted.

Aboard recent aircraft, fault messages originating from the BITE functions of the various items of equipment are consultable from the flight deck. They are furthermore preprocessed, with a view to easing the task of crews and maintenance personnel, by a specialized central computer known by various terms such as CMC from the expression "Central Maintenance Computer" or else CFDIU from the expression "Centralized Fault Display Interface Unit".

This central maintenance computer is accessible by the crew through an interface with keyboard and screen which may be that known by the abbreviation MCDU derived from the expression "Multipurpose Control Display Unit" but which may also be a portable computer of the PC kind attached by a disconnectable data link which does or does not utilize the airplane bus.

Its main function is to effect, in real time or at the end of a flight, a diagnostic of the general situation of the aircraft. This diagnostic is carried out on the basis of a summary of the fault messages received from the various items of equipment of the aircraft.

It also fulfils other functions such as:
  correlation of the fault messages received with the alarms received at the flight deck level;
  running of particular tests on the items of equipment, conducted on request, by an operator intervening from the keyboard-screen interface giving access to the central maintenance computer;
  drafting of a "post-flight" report, known by various terms such as PFR or LLR for "Post Flight Report" or "Last Leg Report". This report is, generally, carried out for the maintenance teams on the ground.

The latter function which consists in providing a "post-flight" report makes it possible to ease the work of the ground maintenance crew.

It comprises:
  the log of the fault messages emitted by the various items of equipment of the aircraft;
  the alarms presented to the crew;
  the summary of the fault messages made as a last resort;
  the information on the operating states of the items of equipment.

The information featuring in this report results from automatic exploitation of the equipment fault messages or remarks by the crew.

The faults are generally correlated with the estimated lifetimes of the items of equipment. The lifetime of an item of equipment or of an electronic module results from a function which can:
  either give the remaining lifetime, in this case it is generally called "time to live estimator" in the art, denoted TTL estimator;
  or give a mean life time between two probable successive faults, in this case it is generally called "Mean Time Between Failure" in the art, customarily denoted MTBF.

The MTBF is estimated, generally, in operating hours; it is estimated on the basis of a reliability model. It is given at the start of the life of the equipment or electronic module and is no longer readjusted or modified throughout the life cycle of the said equipment or electronic module.

The remaining lifetime, termed TTL, takes into account the possible degradations of an item of equipment and its MTBF.

These various monitoring, maintenance and diagnostic functions are implemented on equipment, modules or electronic cards or else links connecting these various components.

The entity that the maintenance operator can extract from a system so as to subject it to various tests during maintenance, repair it or replace it, is generally called an LRU, the terminology standing for "Line Replaceable Unit", Among these various functions, the reliability model used is theoretical and relies on probabilistic failure considerations. The MTBF of an LRU is currently determined at the start of the life cycle of the said LRU.

This MTBF data item for each LRU makes it possible to table a maintenance plan for each LRU included within an overall maintenance plan.

One of the main concerns is to schedule a maintenance and replacement plan for the various LRUs representing the actual fault frequencies, the aim being to immobilize an LRU for maintenance operations, neither too early nor too late.

FIG. 1 represents the curve representing the standard reliability of an electronic item of equipment, such as those which are integrated within aircraft. The shape of the curve is typical and is called a "bathtub" curve.

The axis 1 represents the failure rate of the LRU, the axis 2 represents the time axis along which the life cycle of the LRU proceeds.

A first slope 3 represents the failure rate of an item of equipment, at the very start of its life. Defective items of equipment are, generally, eliminated after the first tests.

The part of the curve 4 represents a nearly constant failure rate of the equipment. This portion represents the mean time between two faults. Then the slope 5 represents an increasing failure rate relating to the end of the life of the equipment. In practice, equipment rarely goes beyond the part represented by the slope 5.

A major drawback in equipment maintenance, in general, is not to take account of events, throughout the life cycle of the said equipment, in the diagnostics. Therefore, usage is often poorly optimized and results from the errors in assessment between on the one hand the actual lifetime of the equipment and on the other hand the theoretical lifetime.

Additionally, the costs generated by immobilizing certain hardware and the false fault rates are drawbacks which make it necessary to readjust the maintenance data, and more particularly the MTBF data.

The major drawback of this reliability model resides in the fact that events cropping up in the course of the life cycle, such as a change of hardware configuration of the LRU, are not taken into account during the evaluation of the MTBF, the latter being determined initially.

Additionally, today the aeronautical industry has feedback of experience regarding the reliability models of the LRUs deployed on aircraft. It is possible to analyse, for example, the actually noted values of the lifetimes of the LRUs and theoretically estimated lifetimes.

On the other hand, there is no existing means of integrating this feedback of experience into the centralized maintenance system.

SUMMARY OF THE INVENTION

One of the aims of the invention is notably to alleviate the aforesaid drawbacks. For this purpose, the object of the invention is to take into account
- certain events specific to the LRU, occurring in the life cycle of the latter, such as changes of hardware configurations for example;
- certain events outside the LRU, such as the feedback of experience regarding the reliability models of the LRU and to integrate this information into the centralized maintenance system Taking these into account makes it possible to update the maintenance data, notably MTBF information, so as to best schedule the maintenance operations.

Advantageously, the centralized maintenance system for aircraft, the said aircraft comprises:
- components, termed LRUs standing for "Line Replaceable Units", the said LRUs comprising items of equipment and/or electronic modules of the aircraft and/or physical links;
- a centralized maintenance system comprising at least one first database, the said maintenance system receiving information on the LRUs;
- means for updating the data of the database allowing an interface between the centralized maintenance system and means specific to the operator.

Advantageously, the lifetime information for the LRUs is known and contained in the centralized maintenance system and called MTBF, standing for "Mean Time Between Failure".

Advantageously, the said digital database comprises the MTBF data of each LRU, the said MTBF data being able to be modified in the database by the updating means, in the course of the life of each LRU, according to at least one event modifying the failure probabilities for at least one LRU.

Advantageously, at least one event is at least one change of hardware configuration of at least one LRU, the MTBF information cue associated with the LRU and its hardware configuration being updated and saved in the database, the hardware configuration being tagged by an index number (PN) of the said LRU, the said MTBF being denoted $MTBF_{PN}$.

Advantageously, an event represents taking into account the mean MTBF, denoted CMTBF, corresponding to the mean of a set of measurements relating to the measured duration between two consecutive failures of an LRU, the said measurements being carried out on an enumerated set of LRUs of the same type that are integrated within other aircraft and constitute a feedback of experience relating to the reliability of the said LRU.

Advantageously, each LRU of the set possesses the same hardware configuration.

Advantageously, the remaining lifetime of at least one LRU is saved in the database, the latter being calculated on the basis of the information arising from the item of equipment and readjusted on the basis of the information of the database comprising the modifiable MTBF information.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE INVENTION

Figure 1:
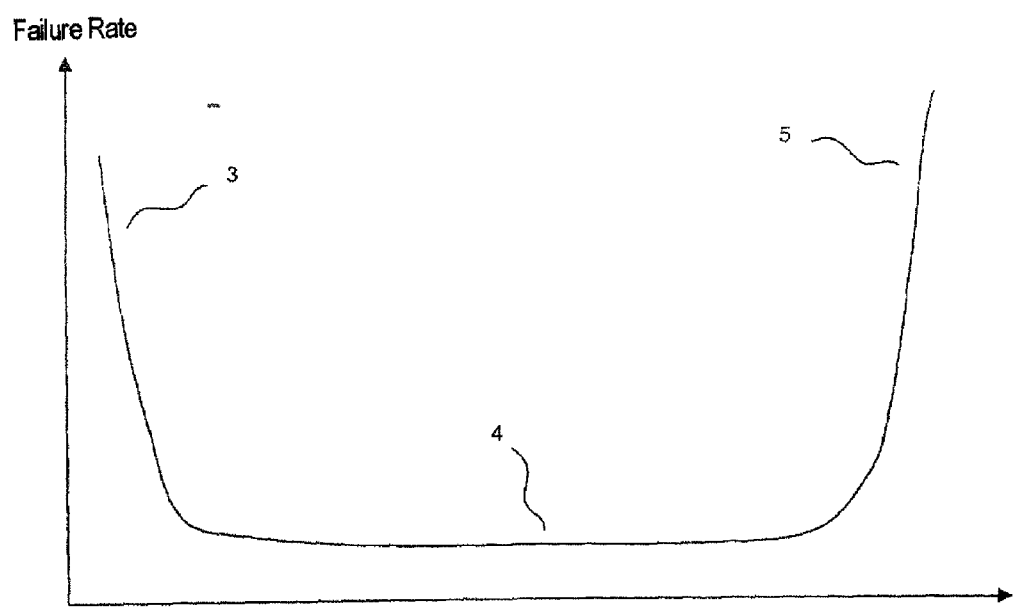
FIG. 1: profile of a reliability model for equipment in aeronautics.
Figure 2:
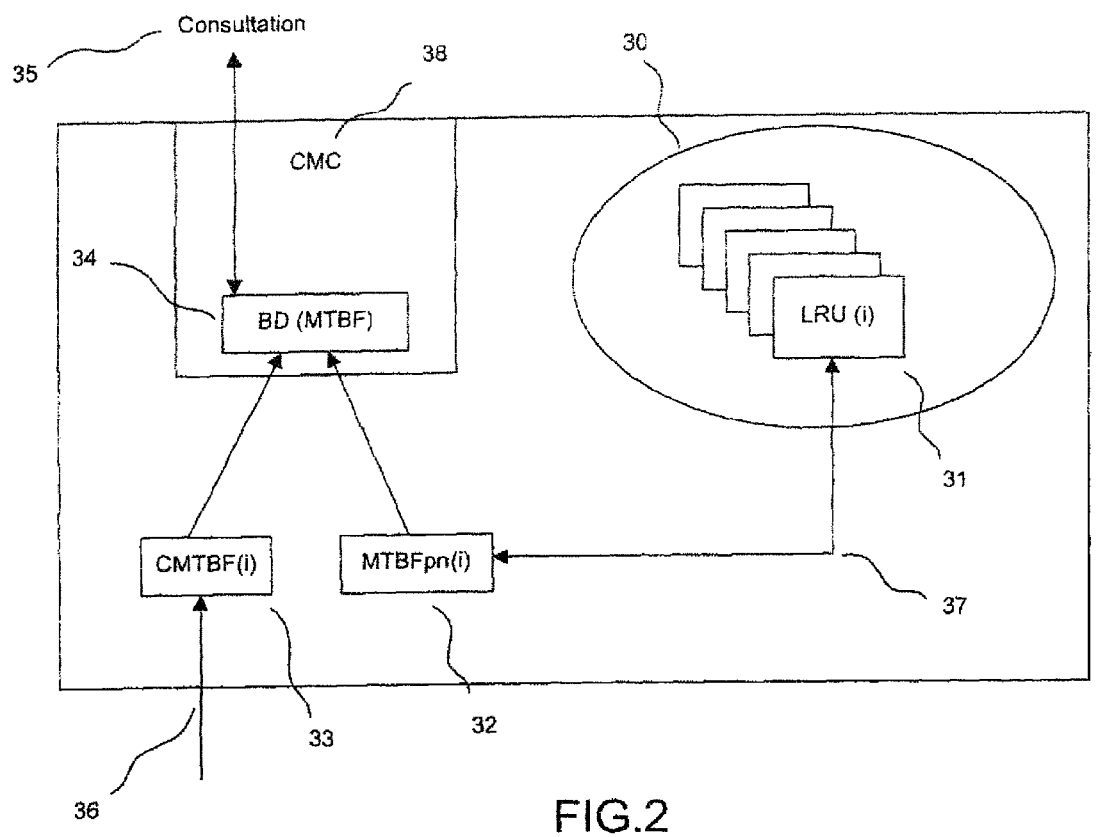
FIG. 2: update of the database of the MTBFs.

The present invention proposes to centralize all the information, relating to the MTBF and/or TTLs of the LRUs onboard an aircraft, in a modifiable database. This centralization of the MTBF and/or TTL related information is possible based on the knowledge of the airplane configuration.

The airplane configuration is, generally, available in a centralized function for managing the airplane configuration or directly in the centralized maintenance function.

The MTBF information is centralized in a database contained in the centralized maintenance system. An update of the MTBF information in the database is performed by the maintenance operator. The latter manually modifies the value of the modifiable MTBF of an LRU on the basis of a download function of the centralized maintenance system. The download function currently exists but it does not make it possible to modify the saved MTBF values. Manual modification of the database will subsequently signify "based on an operator action".

The method according to the invention makes it possible to take, notably, into consideration the feedback of experience regarding a type of equipment deployed in the industry. The whole set of data relating to the lifetime of an item of equipment or LRU, to faults and their frequencies is called its "feedback of experience". This method makes it possible to update the database on the basis of collected information relating to the various MTBFs arising from the feedback of experience for each LRU of the same type. The MTBF information, relating to the feedback of experience, is then denoted CMTBF, according to the terminology standing for "current mean time between failure".

The maintenance operator or the user of this equipment can henceforth log certain fault messages, which impact a given LRU, by comparing them with the MTBF information relating to the feedback of experience for this same equipment integrated within other aircraft.

The correlation of the messages regarding functional faults or relating to LRU degradations with on the one hand the theoretical MTBF data and on the other hand MTBF data arising from the feedback of experience, makes it possible to establish a more precise diagnostic during the maintenance operations.

In parallel with this manual modification executed by the maintenance operator during the programmed maintenance plans, the method according to the invention proposes to add, to the database, the MTBF information for an LRU relating to its current hardware configuration. The latter configuration is generally tagged by a "part number", denoted PN. The MTBF of an LRU that has undergone a hardware modification can be denoted $MTBF_{PN}$ so as to reference it unambiguously.

An LRU that has been withdrawn from its operational environment for a maintenance operation such as the replacement of an electronic card within the said LRU for example, then changes PN number. This change is determined intrinsically when it is put back into service in an operational environment, the aircraft for example.

The database is capable of saving the information of the PN number of an LRU:
- either, in a first case of realization, by an action of the maintenance operator during replacement thereof with the aid of the centralized maintenance system's download function;
- or, in a second case of realization, by automatic reconfiguration of the LRU and by transmitting the information, notably the PN, relating to the LRU to the airplane configuration.

The latter step being carried out without major difficulty having regard to the fact that the airplane configuration already takes each LRU into account.

Thus, the database saves the hardware configuration information cue for an LRU and can update a modified MTBF information cue, denoted $MTBF_{PN}$, corresponding to this hardware configuration. For a given LRU, the updated MTBF information is thus more realistic than the initial MTBF information. The $MTBF_{PN}$ of an LRU is calculated on the basis of its new configuration, identically to a conventional calculation of MTBF calculated theoretically on the basis of an initial hardware configuration.

The diagnostic algorithm generated on the basis of the functional faults of the airplane now takes into account the information updated in the course of the life cycle of the LRU rather than theoretical MTBF information.

FIG. 3 represents a system 30 comprising a set of LRUs, whose $i^{th}$ LRU 31, denoted LRU(i), is represented. The latter possesses a hardware configuration identified by the reference PN(i). The centralized maintenance system 38, denoted CMC, comprises a database 34, denoted BD (MTBF), updated on the basis of the data of the MTBFs 33 arising from the feedback of experience, denoted CMTBF(i), for the data relating to the LRU(i) and the MTBF data 32 arising from the last change of configuration of the LRU(i). The update is done by a maintenance operator on the basis of the downloading means 36 or dynamically on the basis of the airplane configuration function by means of a data interface 37. The data are centralized in the database 34. These data are consultable at each maintenance operation 35 and are correlated as required with fault reports.

The method according to the invention also proposes to collect and update the lifetime information, denoted TTL, of an LRU in the database which contains the modifiable MTBF information.

This lifetime information for an LRU is, in a first case of realization, transmitted from the LRU to the database and in a second case of realization estimated on the basis of the modified data of the database containing the modifiable MTBF information. They are, generally, calculated on the basis of the initial MTBF data and messages regarding faults or degradations that may possibly be known.

The TTL information can be transmitted from an LRU to the database or even deduced from the modifiable MTBF data of the database.

The estimated remaining lifetime of an LRU, denoted $\lambda_1$, considering the MTBF data relating to its hardware configuration, is defined by the following relation:

$$\lambda_1 = \frac{1}{TTL} \cdot \frac{MTBF}{MTBF_{PN}}$$

The estimated remaining lifetime of an LRU, denoted $\lambda_2$, considering the MTBF data relating to the feedback of experience for the same type of LRU in industry, is defined by the following relation:

$$\lambda_2 = \frac{1}{TTL} \cdot \frac{MTBF}{CMTBF}$$

If the MTBF information relating to the feedback of experience for a type of LRU having the same configuration is considered, it is possible to deduce the data item denoted $CMTBF_{PN}$ for an LRU and to deduce the coefficient $\lambda_3$ relating to its lifetime through the following relation:

$$\lambda_3 = \frac{1}{TTL} \cdot \frac{MTBF}{CMTBF_{PN}}$$

In an embodiment the coefficients $\lambda_1, \lambda_2, \lambda_3$ can be updated in the database.

The fault rates of the LRUs, or else the MTBFs of the LRUs, such as $MTBF_{PN}$, CMTBF, $CMTBF_{PN}$ can be managed in the database in combination with the fault messages for each LRU.DsaUnee. It is possible to proceed likewise regarding the information relating to the lifetime of an LRU, which is thus functional information The advantages of such a system are on the one hand of improving diagnostics during maintenance operations and on the other hand of reducing notably the false fault rate and the rate at which LRUs are immobilized.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by the definition contained in the appended claims and equivalent thereof.

The invention claimed is:

1. A centralized maintenance system for an aircraft, the aircraft including line replaceable units (LRUs), the LRUs including items of equipment and/or electronic modules of the aircraft and/or physical links, the system comprising:
   at least one digital database including data which is information relating to the LRUs; and
   means for updating the data of the database allowing an interface between the centralized maintenance system and means specific to an operator,
   wherein lifetime information for the LRUs is known and included in the centralized maintenance system,
   wherein said digital database comprises a mean time between failure (MTBF) data of each LRU,
   the MTBF data is modifiable in the database by the updating means, in the course of a life of each LRU, according to at least one event modifying the failure probabilities for at least one LRU, and
   wherein an event entails taking into account the mean MTBF, denoted CMTBF, corresponding to the mean of a set of measurements relating to a measured duration between two consecutive failures of an LRU, said measurements being carried out on an enumerated set of LRUs of the same type that are integrated within other aircraft and constitute a feedback of experience relating to the reliability of said LRU.

2. The system according to claim 1, wherein said at least one event is a change of hardware configuration of an LRU, an MTBF information cue associated with the LRU and with its hardware configuration, denoted $MTBF_{PN}$, being updated and saved in the database.

3. The system according to claim 1, wherein each LRU of the set possesses the same hardware configuration.

4. The system according to claim 1, wherein the remaining lifetime of at least one LRU is saved in the database, said LRU being calculated on the basis of the information arising from the items of equipment and readjusted on the basis of the information of the database comprising the modifiable MTBF information.

* * * * *